(12) United States Patent
Biber et al.

(10) Patent No.: US 9,632,489 B2
(45) Date of Patent: Apr. 25, 2017

(54) AUTONOMOUS WORKING DEVICE FOR GENERATING AND WORKING DYNAMIC PARTIAL SURFACES

(75) Inventors: Peter Biber, Poltringen (DE); Steffen Petereit, Freiberg A.N. (DE); Christoph Koch, Stuttgart (DE); Amos Albert, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 14/346,715

(22) PCT Filed: Jul. 30, 2012

(86) PCT No.: PCT/EP2012/064877
§ 371 (c)(1),
(2), (4) Date: Jun. 16, 2014

(87) PCT Pub. No.: WO2013/041278
PCT Pub. Date: Mar. 28, 2013

(65) Prior Publication Data
US 2014/0324246 A1 Oct. 30, 2014

(30) Foreign Application Priority Data
Sep. 23, 2011 (DE) .......................... 10 2011 083 309

(51) Int. Cl.
*G01C 22/00* (2006.01)
*G05B 13/02* (2006.01)
*G05D 1/02* (2006.01)
*A01D 34/00* (2006.01)

(52) U.S. Cl.
CPC ....... *G05B 13/0205* (2013.01); *A01D 34/008* (2013.01); *G05D 1/0219* (2013.01); *G05D 1/0274* (2013.01); *G05D 2201/0208* (2013.01)

(58) Field of Classification Search
CPC .................... G05B 13/0205; A01D 34/008
See application file for complete search history.

(56) References Cited

U.S. PATENT DOCUMENTS 9,106,083 B2 * 8/2015 Partovi .................. H02J 7/025
2011/0125324 A1 5/2011 Baek et al.
(Continued)

FOREIGN PATENT DOCUMENTS

| CN | 2499819 Y | 7/2002 |
| CN | 1470368 A | 1/2004 |
| CN | 1493434 A | 5/2004 |

(Continued)

OTHER PUBLICATIONS

International Search Report corresponding to PCT Application No. PCT/EP2012/064877, mailed Oct. 17, 2012, (German and English language document) (5 pages).
(Continued)

*Primary Examiner* — Adam Alharbi
(74) *Attorney, Agent, or Firm* — Maginot, Moore & Beck LLP

(57) ABSTRACT

An autonomous working device, in particular an autonomous lawn mower, is configured to travel across a surface that is to be worked. The working device includes a processing unit configured to divide the surface that is to be worked into at least two dynamic partial surfaces to be traveled across separately by the working device.

19 Claims, 5 Drawing Sheets

(56) References Cited

U.S. PATENT DOCUMENTS

2011/0167574 A1* 7/2011 Stout .................... G05D 1/0219
15/3
2014/0324246 A1* 10/2014 Biber ................... G05D 1/0219
700/302

FOREIGN PATENT DOCUMENTS

| CN | 2667484 Y | 12/2004 |
|---|---|---|
| CN | 1659490 A | 8/2005 |
| CN | 1861330 A | 11/2006 |
| CN | 101101203 A | 1/2008 |
| CN | 101432051 A | 5/2009 |
| CN | 101480795 A | 7/2009 |
| DE | 10 2008 011 947 A1 | 9/2009 |
| EP | 1 557 730 A1 | 7/2005 |

OTHER PUBLICATIONS

Acar et al., Morse Decompositions for Coverage Tasks, The International Journal of Robotics Research, Apr. 2002, pp. 331-344, vol. 21, No. 4, Sage Publications, XP-2672247A(14 pages).

* cited by examiner

AUTONOMOUS WORKING DEVICE FOR GENERATING AND WORKING DYNAMIC PARTIAL SURFACES

This application is a 35 U.S.C. §371 National Stage Application of PCT/EP2012/064877, filed on Jul. 30, 2012, which claims the benefit of priority to Serial No. DE 10 2011 083 309.9, filed on Sep. 23, 2011 in Germany, the disclosures of which are incorporated herein by reference in their entirety.

BACKGROUND

An autonomous working device, in particular an autonomous lawnmower, having a computing unit which is provided for traveling along a surface which is to be processed has already been proposed.

SUMMARY

The disclosure is based on an autonomous working device, in particular an autonomous lawnmower, having a computing unit which is provided for traveling along a surface which is to be processed.

It is proposed that the computing unit is provided for dividing the surface which is to be processed into at least two dynamic partial surfaces to be traveled along, which partial surface are to be traveled along separately. An "autonomous working device" is to be understood in this context as meaning, in particular, a device which at least partially automatically carries out work, such as in particular automatically begins work, automatically ends work and/or automatically selects at least one parameter such as, in particular, a distance parameter and/or a reversal point. The device is particularly preferably provided for traveling along a surface and in particular for processing the surface, such as for example sweeping, cleaning with a vacuum cleaner, cleaning and/or mowing a lawn which is located on the surface. In this context, various autonomous working devices which appear appropriate to a person skilled in the art are conceivable such as, for example, an autonomous sweeping machine, an autonomous vacuum cleaner or an autonomous swimming bath cleaning machine etc. However the autonomous working device is formed in particular by an autonomous lawnmower. In addition, a "computing unit" is to be understood as meaning, in particular, a unit having an information input, information processing means and/or an information output. The computing unit advantageously has at least one processor, a memory, input and output means, further electrical components, an operating program, closed-loop control routines, open-loop control routines and/or calculation routines. The components of the computing unit are preferably arranged on a common circuit board and/or advantageously arranged in a common housing. The computing unit is preferably arranged inside part of the autonomous working device which is moved in a driven fashion over the surface to be processed in order to perform work. However, the computing unit could alternatively and/or additionally also be arranged outside the part of the autonomous working device such, for example, in a remote control and/or a fixed station. A connection between the part and the computing unit of the autonomous working device can be made, in particular, via a wireless link. As a result, in particular the computing unit of the autonomous working device can be exported out of the part of the autonomous working device in order to keep loading by dirt low. In addition, as a result the weight of the part of the autonomous working device can be kept low. A "surface to be processed" is to be understood in this context as meaning, in particular, a surface which defines a working area. A "dynamic partial surface" is to be understood in this context as meaning, in particular, a partial surface which is at least essentially newly generated and/or newly sensed at least after a time interval and/or during every new working process. In this context, "at least essentially newly" is to be understood as meaning, in particular, a change by at least 5%, preferably a change by at least 10% and particularly preferably a change by at least 20%. In this context, a "partial surface" is to be understood as meaning, in particular, a surface which forms at least a partial area of the surface to be processed, preferably essentially less than 100% of the entire surface to be processed. Here, "essentially less" is to be understood as meaning, in particular, at least 5% less, preferably at least 10% less and particularly preferably at least 20% less. In addition, in this context "traveling along separately" is to be understood as meaning, in particular, that a partial surface, at least the majority of the surface, is traveled along in a chronologically separate fashion from the travel along a differentiating partial surface. Here, "at least the majority of the surface" is to be understood in this context as meaning, in particular, at least 20% or preferably at least 40%, particularly preferably at least 60% of a surface.

As a result of the inventive embodiment of the autonomous working device, particularly efficient travel along the surface to be processed can advantageously be made available, with which embodiment a high degree of wear and/or severe stressing of the surface to be processed can be avoided. In addition, as a result working time can be kept short.

In addition it is proposed that when a maneuver fails the computing unit is provided for recording the previously traveled—along surface as a traveled—along partial surface and for determining a new partial surface which is to be traveled along. A "failed maneuver" is to be understood in this context as meaning, in particular, a working step which has an at least significant deviation from a planned and/or envisaged working step, in particular due to external influences which are unpredictable for the autonomous working device. In this context, an "at least significant deviation" is to be understood as meaning, in particular, a deviation of an actual value from a setpoint value by more than 2%, preferably by more than 5% and particularly preferably by more than 10%. Various working steps which appear appropriate to a person skilled in the art are conceivable; however, this is particularly preferably to be understood as meaning a change in the direction of travel by at least 10°. As a result it is advantageously possible to prevent a failed maneuver from acting on subsequent accuracy of the traveling along the surface to be traveled along.

Furthermore it is proposed that the computing unit is provided for assigning in each case at least one traveling along strategy to at least the two dynamic partial surfaces, at least partially as a function of at least one specific feature of their shape. A "specific feature of a surface" is to be understood in this context as meaning, in particular, a feature which at least partially defines and/or characterizes a surface. The feature can be formed by a ratio and/or a specific value. The feature is particularly preferably formed by a ratio of a width to a length of the surface and/or by a size of the surface and/or by an extent of convexity of the surface. Various traveling along strategies which appear appropriate to a person skilled in the art such as, in particular a meandering strategy, a spiral strategy or a random strategy, are conceivable. In this context, a "meandering strategy" is to be understood as meaning, in particular, a traveling along strategy during which a surface is traveled along in strips running parallel to one another. The end of a strip is connected in each case to the start of the next adjacent strip. Adjacent strips have opposing directions of travel here. In addition, in this context a "spiral strategy" is to be understood as meaning, in particular, a traveling along strategy in which a surface is traveled along in a spiral shape. The spiral can be moved along either from the outside to the inside or from the inside to the outside. The spiral is preferably moved along, in particular, from the outside to the inside. Furthermore, in this context a "random strategy" is to be understood as meaning, in particular, a traveling along strategy in which a surface is traveled along in such a way that the autonomous working device moves straight ahead and randomly over the surface. If an outer edge of the surface is reached, the autonomous working device turns by a random angle. This process is repeated until the surface is at least approximately traveled along. In this context, "at least approximately" is to be understood as meaning, in particular, at least 70%, preferably at least 80%, particularly preferably at least 90%. As a result, efficient and adapted traveling along can advantageously be implemented.

In addition it is proposed that the autonomous working device has a sensing unit which is provided for detecting at least one sensing element which at least partially bounds the surface which is to be processed. A "sensing unit" is to be understood in this context as meaning, in particular a unit which is provided to register at least one characteristic variable and/or one physical property and preferably at least partially process it, wherein the registering can take place actively such as, in particular, by the generating and emission of an electrical measurement signal, and/or passively, such as, in particular by the registering of a signal. A "sensing element" is to be understood in this context as meaning, in particular, an element which emits at least one signal and/or can be detected by a sensing unit and/or a sensor by means of a particular quality, in order to sense a precise position of the sensing element and/or at least a partial section of the sensing element. As a result, a surface which to be processed can also advantageously be detected appropriately and precisely even in the case of free surfaces to be processed.

Furthermore, it is proposed that the autonomous working device has a locating unit which is provided for determining positions. A "locating unit" is to be understood as in this context as meaning, in particular, a unit which is provided for determining its own relative position in a reference system and/or with respect to a reference point by means of external influencing variables and/or information. Various locating units which appear appropriate to a person skilled in the art are conceivable, but this is to be understood as meaning, in particular, a locating unit corresponding to German laid-open patent application DE 10 2008 011 947 A1. According to said document, the description of the locating unit in laid-open patent application DE 10 2008 011 947 A1, which comprises a locating sensor system and control means, forms part of the present disclosure. As a result, a surface to be traveled along can be traveled along particularly accurately and efficiently. In addition, inaccuracies resulting from traveling errors can be compensated.

In addition it is proposed that the computing unit is provided for producing an outline map of the surface which is to be processed and for determining its own position within the outline map by means of the locating unit. An "outline map" is to be understood in this context as meaning, in particular, a virtual sensing line which is stored in the memory of the computing unit and which represents a boundary of the surface to be processed. As a result precise determination of the position of the autonomous working device can advantageously be implemented within the surface to be processed.

It is also proposed that the computing unit is provided for taking into account an inaccuracy of the locating unit by means of a change in the partial surfaces and an overlap of the partial surfaces which results therefrom. In particular the computing unit is provided for taking into account an inaccuracy of the locating unit by means of an increase in the size of the partial surfaces compared to an unchanged partial surface and a resulting overlap of the partial surfaces. As a result it is easily possible to compensate an inaccuracy of the locating system and complete coverage can be ensured. In addition, cost of the locating system can be reduced by a low accuracy requirement.

Furthermore a method having an autonomous working device, in particular having an autonomous working device according to the disclosure is proposed, which working device is provided for traveling along a surface to be processed, wherein in one step an outer edge of the surface, which outer edge is characterized by a sensing element, is traveled along by the autonomous working device and is combined by a computing unit of the autonomous working device to form an outline map. This step preferably forms an initial step, wherein in this context an "initial step" is to be understood as meaning, in particular, a step which is carried out at least at the beginning of an entire operation and/or after a reset process.

As a result it is advantageously possible for a size and/or a shape of the surface to be processed to be determined and stored. In addition, as a result the outer edge can be traveled along particularly accurately. Furthermore, as a result no manually input map is necessary.

In addition it is proposed that in a step of regular operation the autonomous working device, from a starting point, follows a sensing element over a variable distance and subsequently rotates through a variable angle in the direction of the surface to be processed. In this context, "a regular operation" is to be understood as meaning, in particular, an active phase of the autonomous working device in which the actual task to be performed by the autonomous working device is carried out. As a result, it is advantageously possible easily to implement a variable travel along the surface to be processed. In addition, as a result the surface to be processed can be particularly advantageously divided into two dynamic partial surfaces.

It is advantageously proposed that in a step of regular operation in which the autonomous working device travels straight ahead, a computing unit checks accuracy of the straight-ahead travel. As a result, effective and precise coverage of the surface to be processed can be achieved.

In addition it is proposed that during detection of an inner sensing element by a sensing unit of the autonomous working device the autonomous working device travels around the inner sensing element once and a computing unit of the autonomous working device records in a stored outline map an inner cutout which is bounded by the inner sensing element. As a result, inner cutouts which are bounded by inner sensing elements can be particularly easily stored for subsequent working processes. In addition, a size of the inner cutout can be easily sensed.

Furthermore, it is proposed that during detection of an irregular obstacle the autonomous working device carries out a turn, and a computing unit of the autonomous working device records the area in which the irregular obstacle is located as having been traveled along in a stored outline map. In this context, a size of the irregular obstacle is advantageously estimated as a function of the present outline map. An "irregular obstacle" is to be understood in this context as meaning, in particular, an obstacle which is not bounded by a sensing element and/or cannot be predicted by the autonomous working device and/or is arranged in a movable fashion and/or temporarily on the surface to be processed. In addition, a "turn" is to be understood in this context a meaning, in particular, a movement process in which the orientation of the autonomous working device changes through at least 90° and preferably through at least 120°. However, this is to be particularly preferably understood as meaning, in particular, a turn through 180°. As a result, irregular obstacles can be particularly easily avoided without driving up to the regular obstacle an unnecessary number of times.

BRIEF DESCRIPTION OF THE DRAWINGS

Further advantages result from the following description of the drawings. The drawings illustrate an exemplary embodiment of the disclosure. The drawings, the description and claims contain numerous features in combination. A person skilled in the art will expediently also consider the features individually and combine them to form further appropriate combinations.

In the drawing.

DETAILED DESCRIPTION

Figure 1:
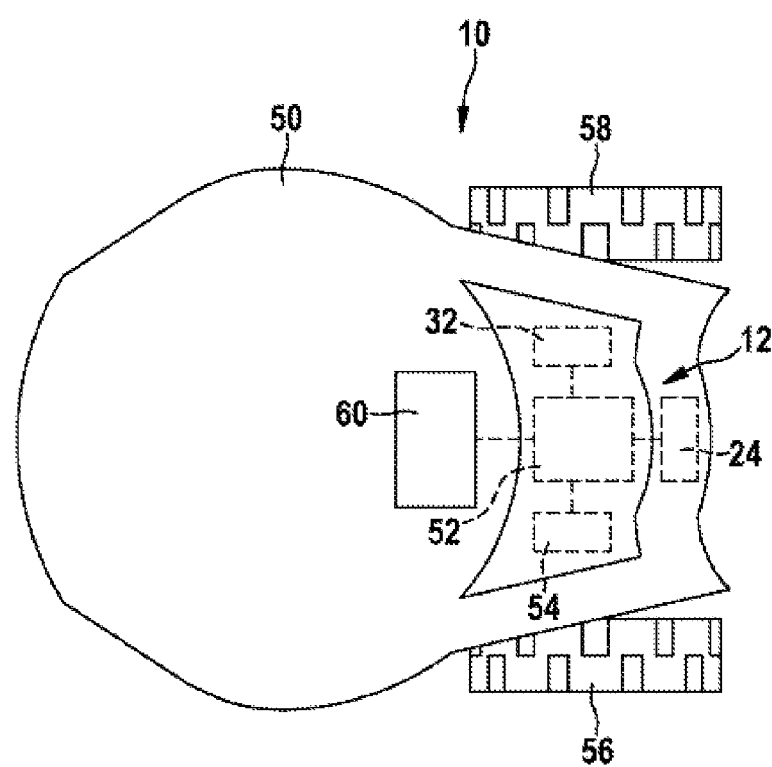
FIG. 1 shows an inventive autonomous working device in a schematic illustration.
Figure 3:
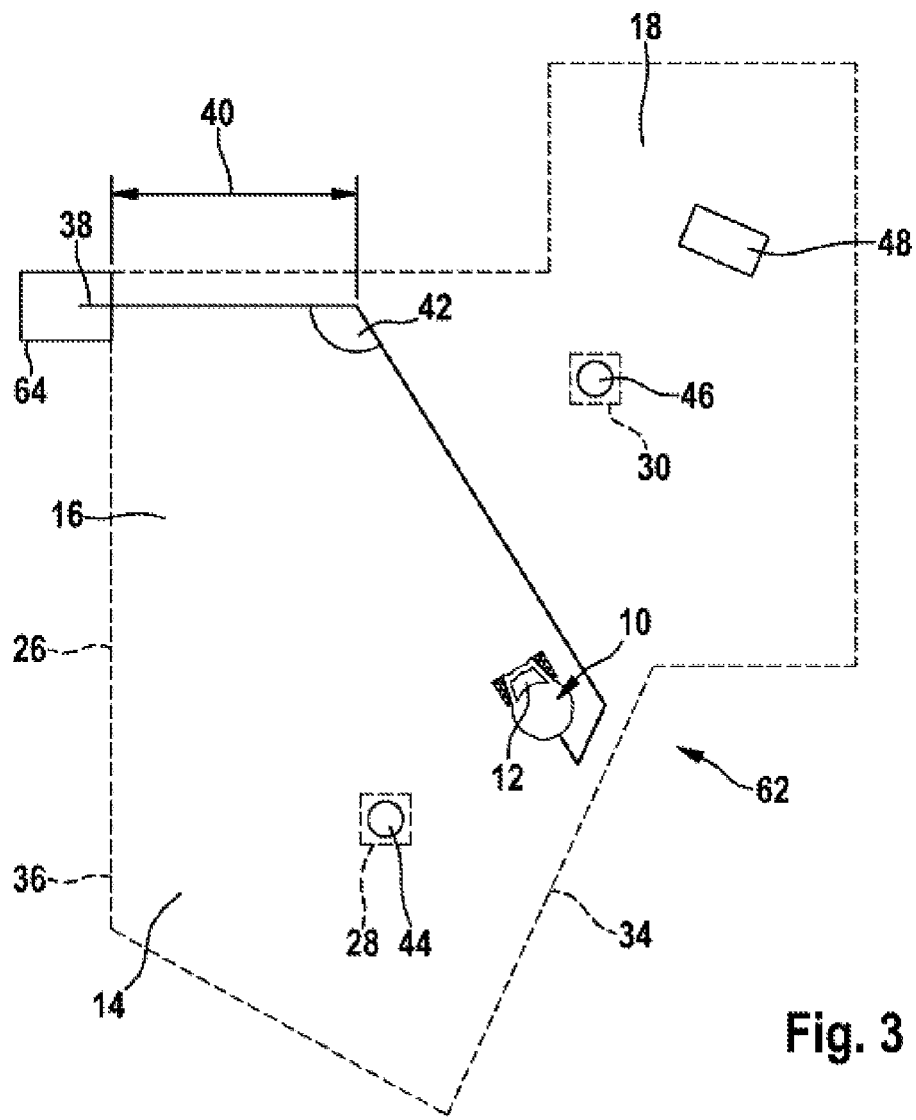
FIG. 3 shows the inventive autonomous working device on the surface to be processed during regular operation in a schematic illustration.

FIG. 1 shows an autonomous working device 10 according to the disclosure having a computing unit 12 which is provided for traveling along a surface 14 to be processed. The autonomous working device 10 is formed by an autonomous lawnmower. The computing unit 12 is arranged in a housing 50 of the autonomous working device 10. The computing unit 12 is provided for dividing the surface 14 to be processed into at least two dynamic partial surfaces 16, 18 to be traveled along, which partial surfaces 16, 18 are to be traveled along separately (FIG. 3). The computing unit 12 comprises a computing core 52 and a memory unit 54. The computing core 52 and the memory unit 54 are connected via a line. The autonomous working device 10 has two front drive wheels 56, 58 which are driven via a drive unit (which cannot be seen further). In addition, the autonomous working device 10 has a rear wheel, which cannot be seen further. The autonomous working device 10 also has an input unit 60. The input unit 60 is arranged on the housing 50 of the autonomous working device 10. The input unit 60 is connected to the computing core 52 of the computing unit 12 via a line.

Furthermore the autonomous working device 10 has a sensor unit 24 which is provided for detecting a sensing element 26, 28, 30 which bounds the processing surface 14. The sensing unit 24 detects here a position of an area of the sensing element 26, 28, 30 lying directly in the vicinity. The sensing unit 24 is arranged in an area of the housing 50 facing the front drive wheels 56, 58 and has, on the side of the housing 50 facing the input unit 60, an arranged sensor, which cannot be seen further. During regular operation, the sensor is directly on an underlying surface on which the autonomous working device 10 is standing or moving.

The sensing unit 24 is connected via a line to the computing core 52 of the computing unit 12. The surface 14 to be processed forms part of the lawnmower surface 62. The sensing element 26, 28, 30 is arranged on an outer edge 36 of the surface 14 to be processed as well as around inner cutouts 44, 46. The sensing element 26, 28, 30 is formed by a sensing wire through which a current flows. The sensing element 26, 28, 30 is arranged on the lawn surface 62.

The autonomous working device 10 has a locating unit 32 which is provided for determining positions. The locating unit 32 is formed by a locating unit corresponding to the German laid-open application DE 10 2008 011 947 A1, which comprises a locating sensor system and a control means. The locating unit 32 is arranged in an area of the housing 50 facing the front drive wheels 56, 58. The locating unit 32 is connected via a line to the computing core 52 of the computing unit 12.

Figure 5:
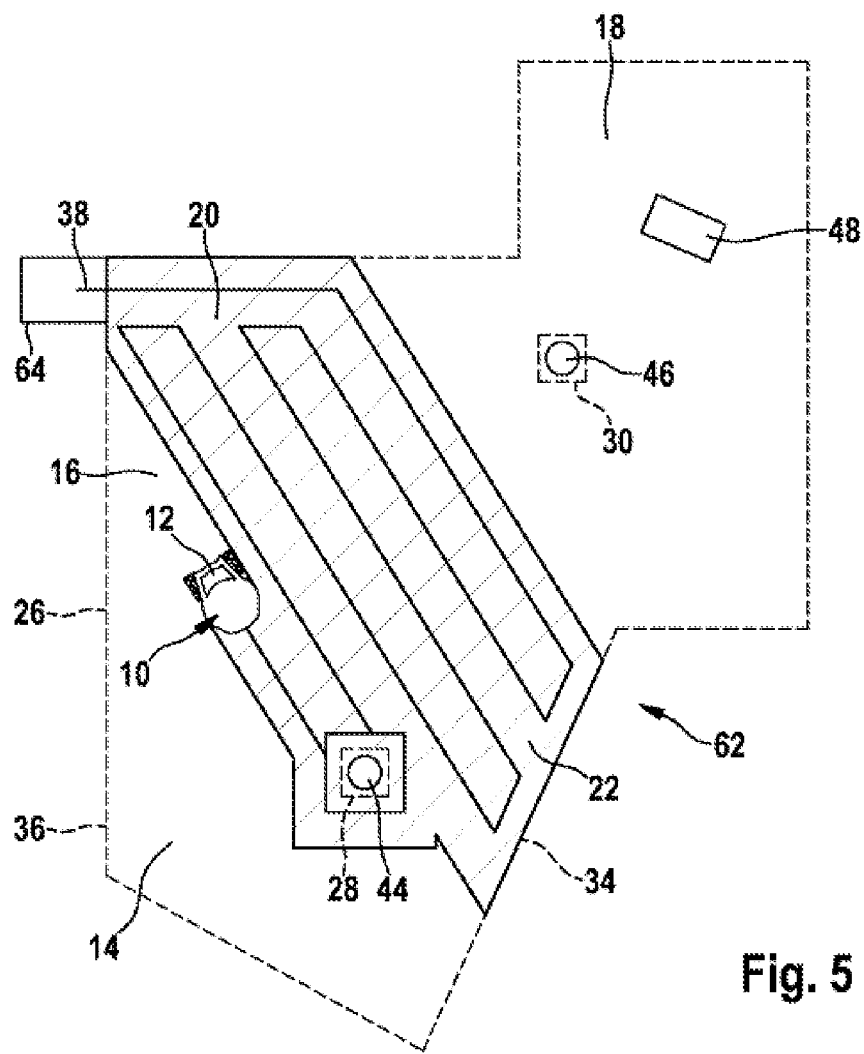
FIG. 5 shows the inventive autonomous working device on the surface to be processed during regular operation with a marked, previously traveled-along surface in a schematic illustration.

The computing unit 12 is provided for noting, in the case of a failed maneuver, the surface 20 traveled along until then as a traveled-along partial surface 22 and for determining a new partial surface to be traveled along (FIG. 5). If the autonomous working device 10 does not manage to perform a turn, after which the autonomous working device 10 is not located correctly in terms of its position and/or its orientation after a turn or is no longer located on the surface to be processed, the surface 20 which has previously been traveled along is marked by the computing unit 12 as a traveled along partial surface 22 and travel along a new partial surface is begun.

The computing unit 12 is provided for assigning in each case at least one traveling along strategy to the two dynamic partial surfaces 16, 18 partially as a function of the specific feature of their shape. The computing unit 12 is provided for assigning in each case a traveling along strategy to the partial surfaces 16, 18 as a function of their sizes and their ratios of length and width.

In addition, the computing unit 12 is provided for producing an outline map 34 of the surface 14 to be processed and for determining its own position within the outline map 34 by means of the locating unit 32. The outline map 34 is stored in memory unit 54 of the computing unit 12.

Furthermore, the computing unit 12 is provided for taking into account an inaccuracy of the locating unit 32 by means of a change in the partial surfaces 16, 18 and a resulting overlap of the partial surfaces 16, 18. The partial surfaces 16, 18 are each enlarged in comparison with an unchanged original partial surface. The individual partial surfaces 16, 18 are each increased in size by an inaccuracy factor of the locating unit 32 by the computing unit 12. The inaccuracy of the locating unit is a meter, according to which the partial surfaces are each increased in size by a meter in the outward direction. By increasing the size of the partial surfaces 16, 18, a theoretical overlap of the partial surfaces 16, 18 is created which compensates inaccurate determination of position and as a result inaccurate determination of location of the partial surfaces 16, 18 by the locating unit 32.

In order to activate the autonomous working device 10 the sensing element 26, 28, 30 is positioned on the lawn surface 62 by an operator, and therefore the surface 14 which is to be processed is marked. Subsequently, a station 64 is positioned on an edge of the surface 14 which is to be processed. The station 64 serves as a starting point 38, and as a charging station of the autonomous working device 10. The operator can subsequently position the autonomous working device 10 in the station 64 and activate it.

Figure 2:
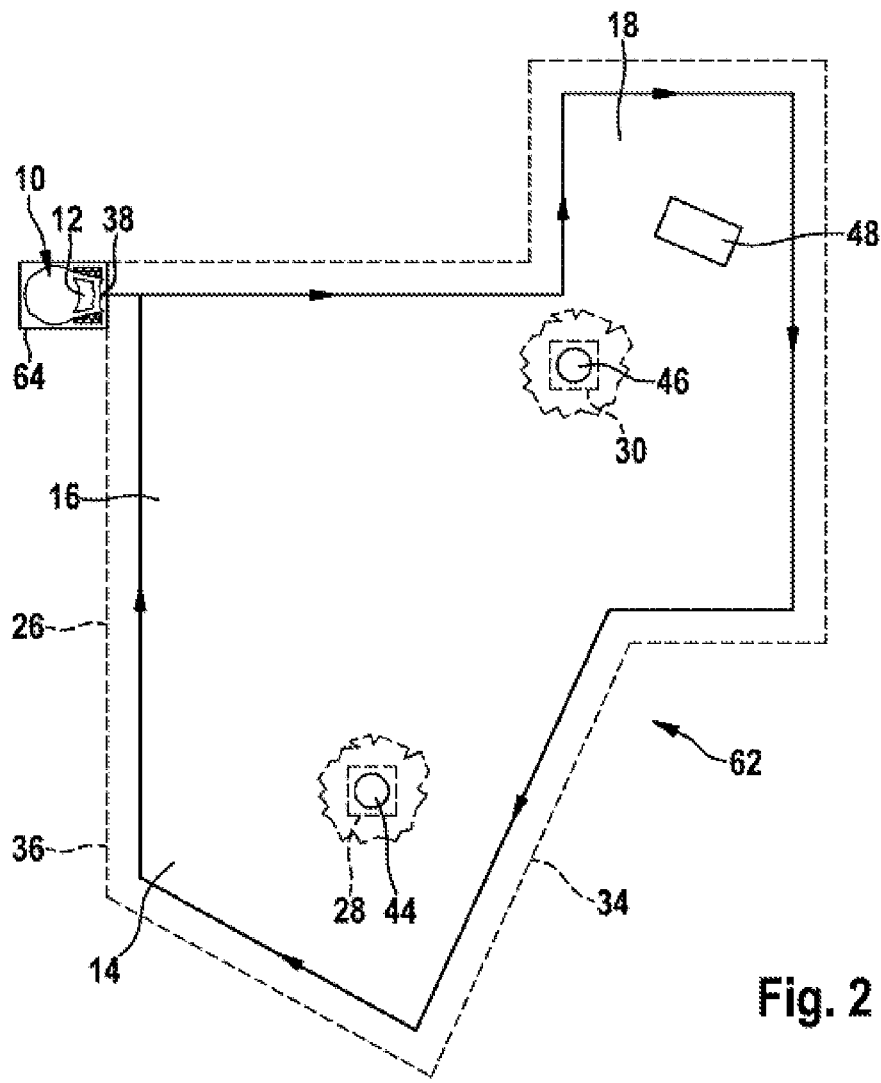
FIG. 2 shows the inventive autonomous working device in a station on a surface to be processed during initial operation in a schematic illustration.

Before regular operation starts, an initial step is initiated. In the initial step, an outer edge 36 of the surface 14 which is to be processed and which is characterized by the sensing element 26 is traveled along by the autonomous working device 10 and combined by the computing unit 12 of the autonomous working device 10 to form the outline map 34 (FIG. 2). The space and a precise position of the outline map 34 with respect to a reference system of the locating unit 32 are stored in the memory unit 54 of the computing unit 12. In order to follow the outer edge 36, the sensing unit 24 of the autonomous working device 10 detects a profile of the sensing element 26. After the termination of the initial step, the autonomous working device 10 returns automatically into its station 64. The regular operation then starts.

In a first step of regular operation, the autonomous working device 10, from the starting point 38, follows the sensing element 26 over a variable distance 40 and subsequently rotates through a variable angle of 42 in the direction of the surface 14 which is to be processed. The variable distance 40 and the variable angle 42 are generated at random by means of the computing unit 12, wherein the variable distance 40 is between zero and a length of the outer sensing element 26. The variable angle 42 is generated with a value between 0° and 180°. Through the first step of the regular operation, the surface 14 which is to be processed is divided autonomously into the two dynamic partial surfaces 16, 18 to be traveled along, which partial surfaces 16, 18 are to be traveled along separately. (FIG. 3). The computing unit 12 assigns in each case a traveling strategy to the partial surfaces 16, 18 as a function of specific features of their shape. Subsequently, in a further step the partial surfaces 16, 18 are traveled along separately in their assigned traveling along strategy. While the partial surfaces 16, 18 are being traveled along, while the autonomous working device 10 is traveling straight ahead, the accuracy of the straight-ahead travel is checked by the computing unit 12 by means of the locating unit 32. The locating unit 32 briefly becomes accurate here (FIG. 4).

If a partial surface 16, 18 has been traveled along completely or if a maneuver fails, all the partial surfaces 16, 18 which not been mowed up to this time are identified by means of the computing unit 12. The spatially closest partial surface is subsequently traveled along in accordance with its traveling along strategy assigned by the computing unit 12.

Figure 4:
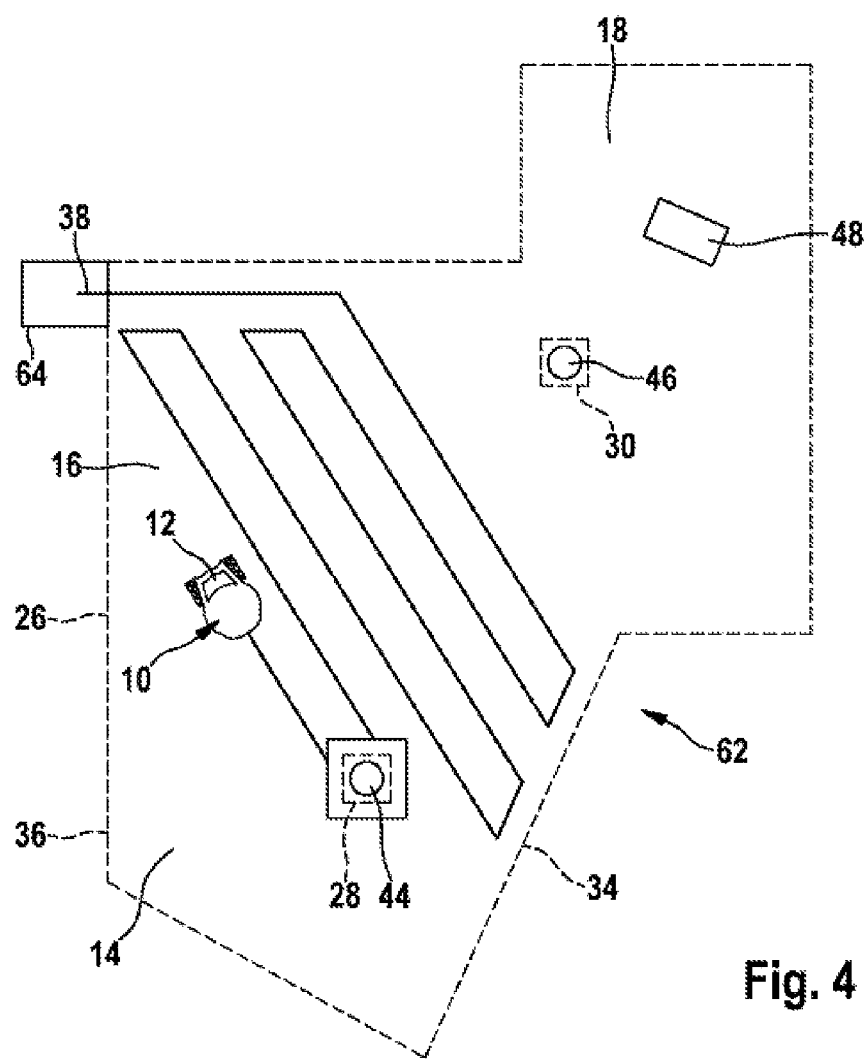
FIG. 4 shows the inventive autonomous working device on the surface to be processed during regular operation in an alternative position in a schematic illustration.

If one of the inner sensing elements 28, 30 is detected by the sensing unit 24 of the autonomous working device 10 while the partial surfaces 16, 18 are being traveled along, the autonomous working device 10 travels around the inner sensing element 28, 30 once and the computing unit 12 of the autonomous working device 10 records an inner cutout 44, 46 which is bounded by the inner sensing element 28, 30 in the stored outline map 34 (FIG. 4). The inner cutouts 44, 46 are permanently stored in the outline map 34. If the autonomous working device 10 travels beyond a starting point and further along the inner sensing element 28, 30 while it is traveling around, a turn is carried out and the autonomous working device 10 returns to the starting point and processing is continued. The differentiation between one of the inner sensing element 28, 30 and the outer sensing element 26 is carried out by means of the computing unit 12 and the locating unit 32. A position within the outline line map 34 is sensed by the stored outline map 34 and the locating unit 32. If one of the sensing elements 26, 28, 30 is detected and the autonomous working device 10 is not located at an edge of the outline map 34, said element is one of the inner sensing elements 28, 30.

If an irregular obstacle 48 is detected during the traveling along, the autonomous working device 10 carries out a turn and the computing unit 12 of the autonomous working device 10 records the area in which the irregular obstacle 48 is located in the outline map as having being traveled along. The irregular obstacle 48 is stored temporarily. A size of the obstacle 48 is estimated on the basis of the outline map 34. If the obstacle 48 is located near to the boundary of the outline map 34, the size of the obstacle 48 up to the boundary is estimated. If the obstacle 48 is in the center of the outline map 34, a size corresponding to a standard value is estimated. If the obstacle 48 is larger than this standard value, the obstacle 48 is approached once more and detected as a further obstacle 48, as a result of which an estimated size of the obstacle 48 approaches a real value.

If all the partial surfaces 16, 18 are traveled along the autonomous working device 10 travels back autonomously into its station 64. In the station 64, the autonomous working device 10 is charged by means of an interface (not visible further). In addition, in the station 64, the temporary memory of the memory unit 54 in which the already traveled-along surface is stored is cleared. After a predefined time interval and/or at a predefined time, the autonomous working device 10 starts again with the regular operation. The time interval and/or the predefined time can be input by means of the input unit 60 of the autonomous working device 10. In addition, a frequency of the initial step can be input by means of the input unit 60 in order to take into account a changing surface 14 which is to be processed.

The invention claimed is:

1. An autonomous working device, comprising:
a computing unit configured to travel along a surface to be processed, the computing unit further configured to randomly divide the surface to be processed into at least two dynamic partial surfaces to be traveled along during a first working process of the surface to be processed, wherein the at least two partial surfaces are to be traveled along separately and jointly correspond to the entire surface to be processed, such that the randomly divided at least two dynamic partial surfaces of the first working process are different from at least two dynamic partial surfaces randomly divided with the autonomous working device from the surface to be processed which jointly correspond to the entire surface to be processed for a second working process of the surface to be processed.

2. The autonomous working device as claimed in claim 1, wherein, when a maneuver fails, the computing unit is configured to (i) record the previously traveled-along surface as a traveled-along partial surface and (ii) determine a new partial surface to be traveled along.

3. The autonomous working device as claimed in claim 1, wherein the computing unit is configured to assign to at least the two dynamic partial surfaces at least one respective traveling along strategy at least partially as a function of at least one specific feature of their shape.

4. The autonomous working device as claimed in claim 1, further comprising a sensing unit configured to detect at least one sensing element that at least partially bounds the surface to be processed.

5. The autonomous working device as claimed in claim 1, further comprising a locating unit configured to determine positions.

6. The autonomous working device as claimed in claim 5, wherein the computing unit is further configured to (i) produce an outline map of the surface to be processed and (ii) determine its own position within the outline map by use of the locating unit.

7. The autonomous working device as claimed in claim 5, wherein the computing unit is further configured to take into account an inaccuracy of the locating unit by a change in the partial surfaces and a resulting overlap of the partial surfaces.

8. A method of using an autonomous working device configured to travel along a surface to be processed, the method comprising:
   randomly dividing with the autonomous working device the surface to be processed on an at least partially autonomous basis into at least two dynamic partial surfaces to be traveled along during a first working process of the surface to be processed, wherein the at least two partial surfaces are to be traveled along separately and jointly correspond to the entire surface to be processed, such that the randomly divided at least two dynamic partial surfaces of the first working process are different from at least two dynamic partial surfaces randomly divided with the autonomous working device from the surface to be processed which jointly correspond to the entire surface to be processed for a second working process of the surface to be processed.

9. The method as claimed in claim 8, wherein an outer edge of the surface to be processed includes a sensing element, the method further comprising:
   traveling the outer edge with the autonomous working device using the sensing element; and
   generating an outline map with a computing unit of the autonomous working device based upon the traveling prior to randomly dividing the surface to be processed.

10. The method as claimed in claim 8, wherein, during the first working process, the working device follows a sensing element from a starting point along an outer edge of the surface over a variable distance and subsequently rotates through a variable angle in the direction of the surface to be processed based upon the random division of the surface to be processed.

11. The method as claimed in claim 8, wherein:
   during detection of an inner sensing element by a sensing unit of the autonomous working device, the autonomous working device travels around the inner sensing element once; and
   a computing unit of the autonomous working device records in a stored outline map an inner cutout bounded by the inner sensing element.

12. The method as claimed in claim 8, wherein:
   during detection of an irregular obstacle, the autonomous working device carries out a turn; and
   a computing unit of the autonomous working device records the area in which the irregular obstacle is located as having been traveled along in a stored outline map.

13. The autonomous working device as claimed in claim 1, wherein the autonomous working device is configured as an autonomous lawnmower.

14. The method of claim 8, wherein randomly dividing with the autonomous working device the surface to be processed comprises:
   generating with a computing device a random initial distance to be traveled, the random initial distance between zero and a length of a sensing element of the surface to be processed;
   generating with the computing device a random initial angle to be rotated immediately after traveling the random initial distance; and
   dividing with the computing device the surface to be processed based upon the generated random initial distance and random initial angle.

15. The method of claim 14, wherein the random initial angle is between zero degrees and 180 degrees.

16. The method of claim 8, further comprising:
   determining with the autonomous working device when a maneuver fails during the first working process;
   identifying each of the at least two dynamic surfaces which has not been processed after the determined maneuver failure;
   identifying a closest one of the identified at least two dynamic surfaces which has not been processed after the determined maneuver failure; and
   processing the identified closest one of the identified at least two dynamic surfaces before processing any of the other identified at least two dynamic surfaces.

17. The device of claim 1, wherein the computing unit is configured to randomly divide the surface to be processed by:
   generating a random initial distance to be traveled, the random initial distance between zero and a length of a sensing element of the surface to be processed;
   generating a random initial angle to be rotated immediately after traveling the random initial distance; and
   dividing the surface to be processed based upon the generated random initial distance and random initial angle.

18. The device of claim 17, wherein the random initial angle is between zero degrees and 180 degrees.

19. The device of claim 1, wherein the computing unit is further configured to:
   determine when a maneuver fails during the first working process;
   identify each of the at least two dynamic surfaces which has not been processed after the determined maneuver failure;
   identify a closest one of the identified at least two dynamic surfaces which has not been processed after the determined maneuver failure; and
   process the identified closest one of the identified at least two dynamic surfaces before any of the other identified at least two dynamic surfaces.

* * * * *